(12) United States Patent
Oh (10) Patent No.: US 8,508,664 B2
(45) Date of Patent: Aug. 13, 2013

(54) METHOD AND APPARATUS FOR MONITORING ANOTHER VIDEO SOURCE

(75) Inventor: Myunghee Oh, Seongnam-si (KR)

(73) Assignee: Humax Co., Ltd., Seongman-Si, Gyeonggi-Do (KR)

( * ) Notice: Subject to any disclaimer, the term of this patent is extended or adjusted under 35 U.S.C. 154(b) by 198 days.

(21) Appl. No.: 13/033,964

(22) Filed: Feb. 24, 2011

(65) Prior Publication Data
US 2012/0013801 A1    Jan. 19, 2012

(30) Foreign Application Priority Data

Jul. 16, 2010  (KR) ........................ 10-2010-0068768

(51) Int. Cl.
*H04N 5/45* (2011.01)
(52) U.S. Cl.
USPC ............................ 348/565; 348/469; 348/564
(58) Field of Classification Search
USPC ................. 348/565, 563–564, 569, 553–555, 348/561–562, 568, 581, 705–706, 469
IPC ....................................................... H04N 5/45
See application file for complete search history.

(56) References Cited

U.S. PATENT DOCUMENTS

| | | | |
|---|---|---|---|
| 7,253,843 B2 * | 8/2007 | Lee | 348/565 |
| 7,948,561 B2 * | 5/2011 | Yun et al. | 348/565 |
| 8,194,187 B2 * | 6/2012 | Kim | 348/565 |
| 2009/0147140 A1 * | 6/2009 | Kim | 348/565 |

* cited by examiner

*Primary Examiner* — Trang U Tran
(74) *Attorney, Agent, or Firm* — Ked & Associates, LLP (57) ABSTRACT

The present invention provides a method for monitoring another video source in addition to a current video source. One method according to the present invention comprises outputting a first video signal provided from a first contents source (for example, a broadcasting channel) and displaying a video from a second video signal provided from a second contents source intermittently with a video from the first video signal on a single screen. During the displaying, a multi-view displaying operation, in which the video from the second video signal is displayed together with the video from the first video signal on the single screen for a first time period, and a single-view displaying operation, in which the video from the first video signal is displayed alone on the single screen for a second time period longer than the first time period, are repeated in an alternate manner.

20 Claims, 9 Drawing Sheets

FIG. 1

BACKGROUND ART

METHOD AND APPARATUS FOR MONITORING ANOTHER VIDEO SOURCE

TECHNICAL FIELD

The present invention relates to a method and an apparatus enabling a viewer to monitor another video source while a viewer is watching contents of a video source such as a broadcasting channel.

BACKGROUND ART

The increase of broadcasting services coming from terrestrial, cable, and satellite broadcasting resulted in diversified broadcasting channels, allowing viewers to enjoy abundant video contents.

As the video contents become abundant, overlapping of broadcasting time of popular programs frequently happens; in this case, to watch a broadcasting program that the viewer wants to watch while avoiding advertisements as possibly as he or she can, the viewer may more or less repeat switching between a current channel and a channel where the broadcasting program the viewer wants to watch is broadcast.

Although broadcasting signals are provided in such a way that EPG (Electronic Program Guide) information is included therein as broadcasting services are being digitalized, it is not uncommon the EPG information provides incorrect program start time; therefore, even if the viewer switches channels based on the EPG information, it is likely that a broadcasting program wanted has not started yet on a switched channel. In this case, the viewer may again repeat the channel switching more or less while watching the program broadcast on the previous channel.

Figure 1:
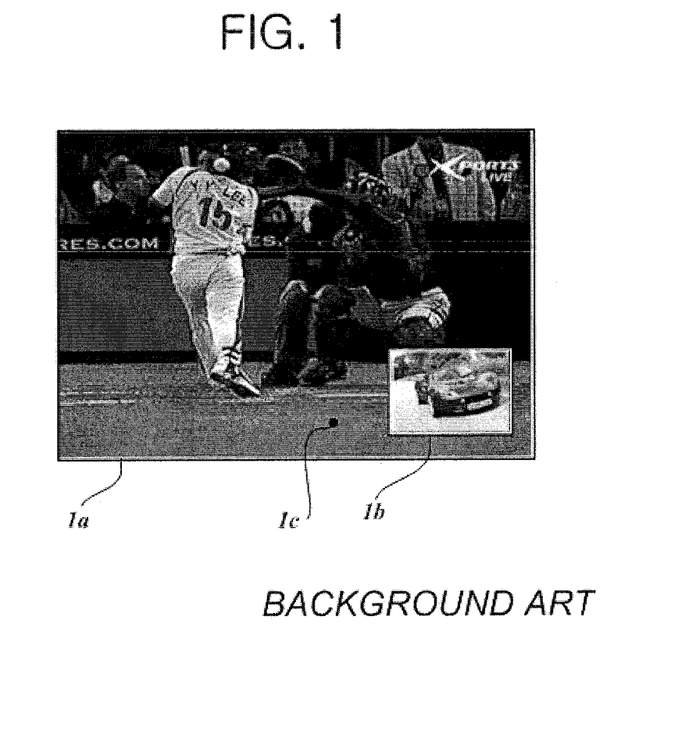
FIG. 1 illustrates an example of a screen where multiple contents sources are shown at the same time in a large and a small screen.

The viewer, to avoid the tedious channel switching, may display a broadcasting program of a target channel to which the viewer wants to switch after a while together with a broadcasting program that the viewer is currently watching in the form of a main screen 1*a* and an auxiliary window 1*b* as shown in FIG. 1, thereby continuously checking the start of the broadcasting program in the target channel. Since a part 1*b* of a currently watched video 1*c* is continuously occupied by the broadcasting program from another video channel in a PIP (Picture in Picture) type display as shown in FIG. 1, the viewer may feel uncomfortable due to the blocking video zone.

BRIEF SUMMARY OF THE INVENTION

The present invention is directed to provide a method and an apparatus for monitoring another video source while keeping difficulty in viewing a contents source to a minimum.

The present invention is further directed to provide a method and an apparatus for monitoring video sources not to miss primary scenes of the respective contents sources as possibly as can be, allowing the primary scenes to be viewed alternately.

The scope of the present invention is not necessarily limited to the above explicit statements. Rather, the scope of the present invention covers anything to accomplish effects that could be derived from the below specific and illustrative explanations of the present invention.

A method for monitoring another video source according to one aspect of the present invention comprises: outputting a first video signal provided from a first content source; and displaying a video from a second video signal intermittently with a video from the first video signal on a single screen, the second video signal being provided from a second content source, by: causing the single screen to be in a multi-view state where a video from the second video signal is displayed with a video from the first video signal on the single screen for a first time period; causing the single screen to be in a single-view state, after the first time period, where a video from the first video signal is displayed alone on the single screen for a second time period longer than the first time period; and causing the multi-view state and the single-view state to be repeated in an alternate manner on the single screen after the second time period.

In one embodiment according to the present invention, the method further comprises: switching between a video area for the first video signal and a video area for the second video signal on the single screen according to a request of a user; and causing the single screen to display a video from the first video signal intermittently with a video from the second video signal. Further, the switching comprises causing the single screen to display a video from the first video signal with a video from the second video signal during a particular time equal to or shorter than the first time period, and the causing the single screen to display a video from the first video signal intermittently with a video from the second video signal comprises: causing the single screen to be in a first single-view phase, after the particular time, where a video from the second video signal is displayed alone on the single screen for the second time period; causing the single screen to be in a multi-view phase, after the second time period, where a video from the first video signal is displayed with a video from the second video signal on the single screen for the first time period; causing the single screen to be in a second single-view phase, after the first time period, where a video from the second video signal is displayed alone on the single screen for the second time period; and causing the multi-view phase and the second single-view phase to be repeated in an alternate manner.

In another embodiment according to the present invention, the method further comprises: causing the single screen to display a video from the second video signal alone for the second time period according to a request of a user; and causing the single screen to display a video from the first video signal intermittently with a video from the second video signal. Further, the causing the single screen to display a video from the first video signal intermittently with a video from the second video signal comprises: causing the single screen to be in a multi-view phase, after the second time period, where a video from the first video signal is displayed with a video from the second video signal on the single screen for the first time period; causing the single screen to be in a single-view phase, after the first time period, where a video from the second video signal is displayed alone on the single screen for the second time period; and causing the multi-view phase and the single-view phase to be repeated in an alternate manner.

In one embodiment according to the present invention, if the request is not made while the first time period passes, the switching ignores the request and the repetition of the multi-view and second single-view phases or the multi-view and single-view phases is not conducted.

In one embodiment according to the present invention, the second content source is a source of which a video signal is being displayed at a time when a monitoring request is made from a user, and the first content source is a source of which a video signal is being displayed right before a video signal provided from the second content source is displayed.

In another embodiment according to the present invention, the first content source is a source of which a video signal is being displayed at a time when a monitoring request is made from a user, and the second content source is a source of which a video signal is being displayed right before a video signal provided from the first content source is displayed.

In another embodiment according to the present invention, the second content source is a source being designated as a monitoring object by information entered by a user through a provided selection menu screen.

In another embodiment according to the present invention, the second content source corresponds to a program item being designated as a monitoring object from a broadcasting program schedule provided on a screen based on an electronic program guide received through broadcasting signals.

In one embodiment according to the present invention, the displaying a video from the second video signal intermittently with a video from the first video signal on the single screen is started automatically at a specific time. In addition, the specific time may be specified by time information entered directly by a user or by a broadcasting start time of a program item included in an electronic program guide received through broadcasting signals.

In one embodiment according to the present invention, each of the first and second content sources corresponds to any one of a broadcasting channel, video signals received from a connected external video device, video contents stored in a portable storage media connected detachably, a recorded broadcasting program, and stored video contents received through a communication network.

An apparatus for outputting video signals of contents according to another aspect of the present invention comprises: a receiver adapted for obtaining a plurality of contents; a decoder adapted for decoding data of at least one of the plurality of contents obtained by the receiver and outputting one or more video signals of the at least one content; a video formatter adapted for outputting the one or more video signals of which corresponding videos are disposed in a specified layout on a single screen; and a controller adapted for controlling the video formatter for a video from a second video signal belonging to the one or more video signals to be displayed intermittently on the single screen with a video from a first video signal belonging to the one or more video signals. Further, the controller is adapted for controlling the video formatter to: cause the single screen to be in a multi-view state where a video from the second video signal is displayed with a video from the first video signal on the single screen for a first time period; cause the single screen to be in a single-view state, after the first time period, where a video from the first video signal is displayed alone on the single screen for a second time period longer than the first time period; and cause the multi-view state and the single-view state to be repeated in an alternate manner.

In one embodiment according to the present invention, the receiver is adapted for comprising at least one of: a signal demodulator configured to tune to and demodulate a broadcasting signal to output a broadcasting program; a storage device configured to store recoded broadcasting programs; a video device connecting unit configured to receive video signals inputted through connecting terminals; a storage media interfacing unit configured to read out content data from a portable storage medium connected detachably; and a communication unit configured to receive video contents from an external server through a data communication network.

In one embodiment according to the present invention, the controller is adapted for providing an input screen through which a user enters a monitoring interval and a monitoring window display time individually, and assigning the entered monitoring window display time to the first time period and the entered monitoring interval subtracted by the monitoring window display time to the second time period.

In another embodiment according to the present invention, the controller is adapted for providing an input screen through which a user enters a monitoring interval, and assigning a time corresponding to a predetermined ratio of the entered monitoring interval to the first time period and the entered monitoring interval subtracted by the assigned time to the second time period.

The present invention described above and at least one embodiment of the present invention described in detail below allows a user to check what is provided in another contents source while being least interfered for watching a current video. Therefore, the user is enabled not to miss a video wanted provided at another contents source while enjoying the most of watching current video contents.

In addition, if video contents provided are in the form of excerpts corresponding to particular scenes rather than the one requiring continuous watching (for example, scenes of scoring a point in sports broadcasting), the user can watch the corresponding contents sources in an alternate manner through monitoring without missing video contents intervals at which particular scenes occur.

BRIEF DESCRIPTION OF THE DRAWINGS

The accompanying drawings, which are included to provide further understanding of this document and are incorporated to constitute a part of this specification, illustrate embodiments of this document and together with the description serve to explain the principles of this document.

In the drawings.

DETAILED DESCRIPTION OF THE INVENTION

Embodiments of a method and an apparatus for monitoring another video source according to the present invention will be described in detail with reference to appended drawings.

Figure 2:
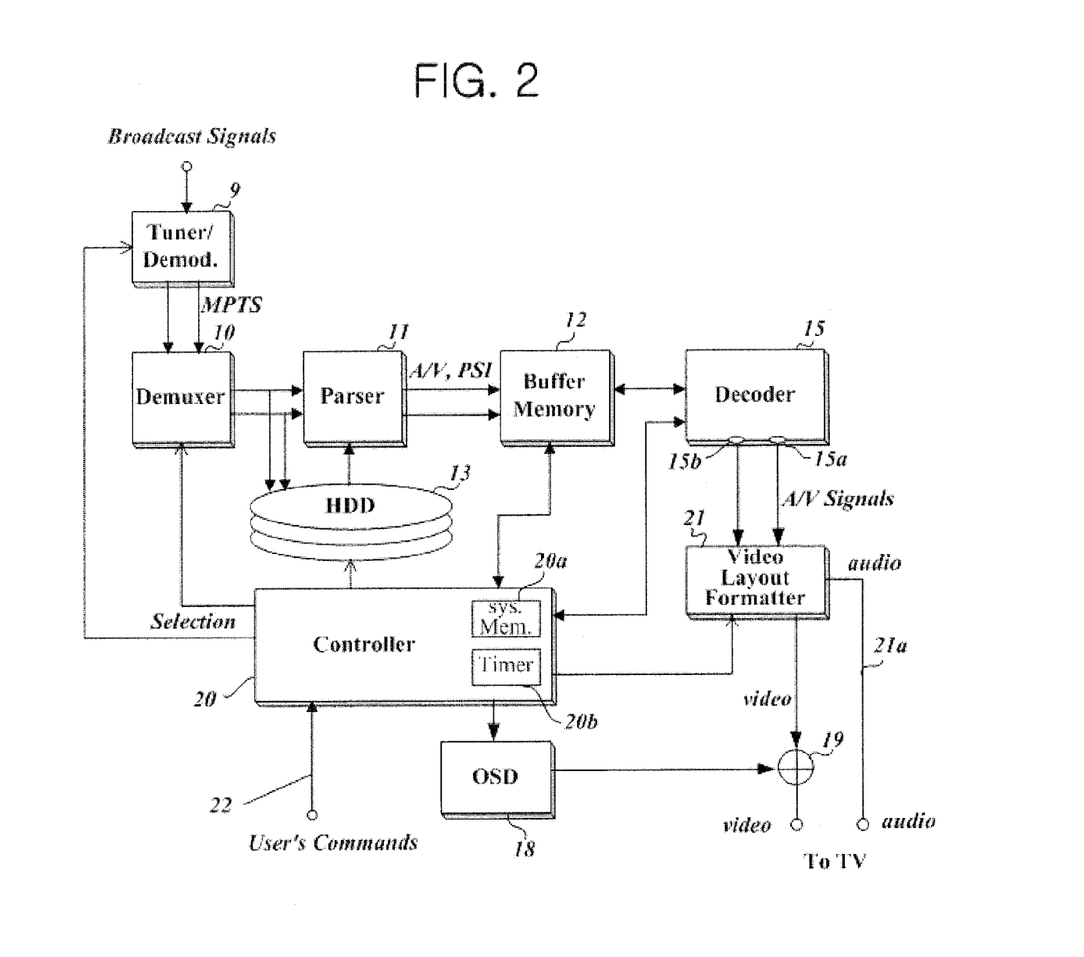
FIG. 2 illustrates a structure of a digital broadcasting receiver where a method for monitoring another video source according to one embodiment of the present invention is implemented.

FIG. 2 illustrates a structure of a digital broadcasting receiver where a method for monitoring another video source while watching a program on a broadcasting channel which is one of video sources is implemented according to one embodiment of the present invention.

The digital broadcasting receiver of FIG. 2 comprises a signal demodulator 9 for tuning to one or more required frequency bands from a broadcasting signal such as a terrestrial, a cable, or a satellite broadcasting signal, demodulating the signal of the tuned frequency band, and outputting the demodulated signal in the form of digital streams; a demultiplexer 10 for outputting a transport stream corresponding to a particular program and the corresponding management information (e.g., PSI) selected among multi-program transport streams (MPTSs) within the demodulated digital streams; a parser 11 for classifying transport packets of the respective transport streams output from the demultiplexer 10 into video, audio, PSI data (e.g., PES packets), and the like; a buffer memory 12 for storing the classified PES packets output from the parser 11 temporarily in the respective areas associated with the corresponding streams; a decoder 15 for decoding the data in the respective areas of the buffer memory 12 and restoring the original AV (audio and video) signals from the decoded data; a video layout formatter 21 for selecting one or more AV signals output from the decoder 15 to format video layout according to a predetermined way; a hard disk 13 for storing one or more transport streams output from the demultiplexer 10; a screen signal generator 18 for generating video signals for characters, symbols, or graphic symbols; a mixer 19 for synthesizing video signals and outputting the synthesized signals; and a controller 20 for controlling the operation of the respective components to display one or more broadcasting signals selected by a request of the user and/or predetermined conditions on the screen. The controller 20 includes a system memory 20a into which information for control operation and/or environment setting is stored; a timer 20b informing of the passing of a predetermined time period; and firmware controlling various functions described below in a selectively executable form.

Also, the apparatus of FIG. 2 can further comprise a device connecting terminal which connects to an external device providing video signals; a media connecting unit which can read out the data of a portable storage medium (a portable memory, USB memory, an external hard disk, and so on) connected in a detachable way; and a data communication unit connected to a network through wired or wireless connection and performing a protocol by which data can be transmitted/received to and from a predetermined remote server. The elements of FIG. 2 can be realized being integrated with a TV or in the form of a device added to a computer or a notebook. Also, the apparatus of FIG. 2 can be a computer where the functions described below are carried out as the computer is equipped with appropriate hardware and runs appropriate software; or an apparatus carrying out the functions equivalent thereto.

The controller 20 receives a request from the user through a conventional user interface such as a keypad, a remote controller, a touch pad, and the like 22; if necessary, the controller 20 outputs video signals guiding a response according to the request by controlling the screen signal generator 18. The video output signals are expressed visually through electronic devices equipped with a screen output function such as a TV, a monitor, and the like.

In what follows, embodiments according to the present invention are described in detail with reference to the digital broadcasting receiver of FIG. 2; however, principles of the present invention are not limited by a conventional name of a device but can be applied to all the devices having a function of processing video contents and outputting the processed video contents as video signals or all the devices equipped with software which carries out the function.

Figure 3:
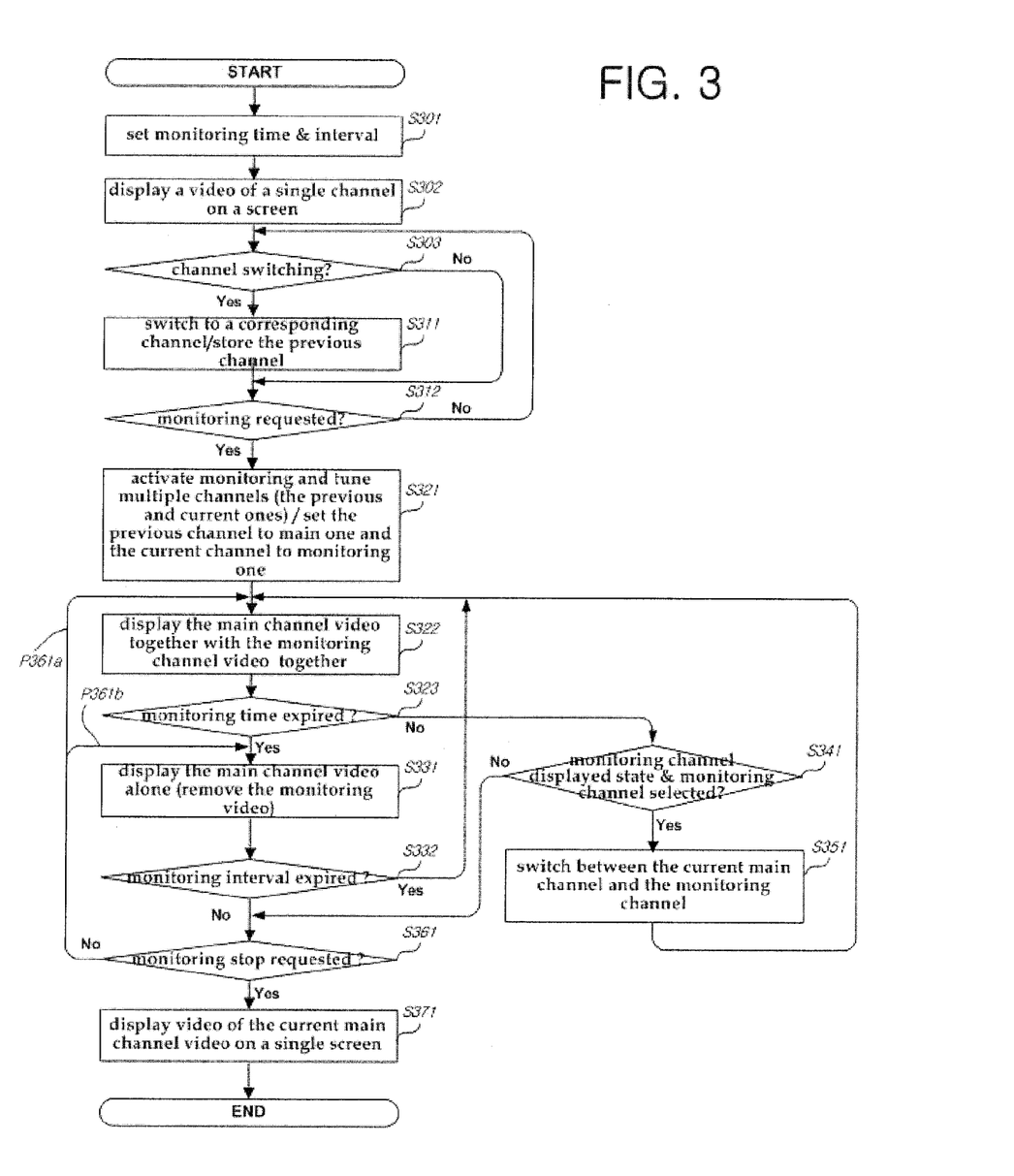
FIG. 3 is a flow chart of a method for monitoring another video source according to one embodiment of the present invention.

FIG. 3 is a flow chart of a method for monitoring another video source such as video of another channel according to one embodiment of the present invention. In what follows, the operation carried out by the apparatus of FIG. 2 according to one embodiment of the present invention will be described in detail in association with the flow chart shown in FIG. 3.

The user sets environmental variable for monitoring (S301) if he or she wants to monitor another channel in addition to a current channel through which he or she is watching a broadcasting program. The environmental variable for monitoring includes a monitoring interval and monitoring time. The monitoring interval relates to frequency by which the video from another channel is checked; the monitoring time corresponds to a period of time during which the video in question is displayed continuously. In addition thereto, the environmental variable for monitoring can include a monitoring activation variable. If the monitoring activation variable is included and is set as an active state, monitoring of another channel is performed according to a particular request of the user such as "monitoring request"; on the other hand, if the monitoring activation variable is set as an inactive state, a guiding note of "inactive state" is displayed and monitoring of another channel is not performed regardless of the same particular request.

After setting the environmental variable for monitoring, if a request is made for resonating at a channel on which a broadcasting program of the user's preference is showing, the program at the corresponding channel is outputted in the form of a video according to the following procedure (S302). The controller 20 applies a command to the signal demodulator 9 and the demultiplexer 10 to resonate at the broadcasting signals corresponding to the channel (and a sub-channel) that the user has designated. According to the command, the signal demodulator 9 demodulates RF signals corresponding to the designated channel (or a repeater) into digital streams by resonating at the RF signals; the demultiplexer 10 selectively outputs transport streams carrying video, audio, and/or text data belonging to one program (in case of multiple programs, corresponding to a sub-channel designated) from among the digital streams received. A basis for classifying and outputting a transport stream corresponding to one program from among the digital streams is ID of a transport packet, namely PID, which can be checked from program specific information such as PAT, PMT, and the like obtained from the corresponding resonated channel before classifying and outputting the transport stream and stored in the buffer memory 12.

The parser 11 gathers only payload data by removing a header of each transport packet from transport packets received and then composes a packetized elementary stream (PES) packet in the buffer memory 12; the parser 11, by referring to the header information of the PES packet composed, classifies the PES packets in the buffer memory 12 according to the properties thereof (for example, video, audio, or data). The decoder 15, by providing PES packets stored sequentially in the buffer memory 12 to the corresponding internal decoding module according to the PES packet type and decoding the PES packets, outputs AV signal (video and audio signal) at a first port 15a.

The controller 20, since it is in the state of single channel tuning, applies a control signal to the video layout formatter 21 to composes video signals for a single video screen from input AV signals and outputs the video signals for a single video screen. Through the procedure above, a broadcasting program of the channel (or the repeater) that the user has selected is expressed visually/audibly to the user as a single screen. In the meantime, while watching the program, if the user makes a request for recording, the controller 20 stores output streams of the demultiplexer 10 in the hard disk 13; if the request is time-shift recording (TSR), the controller 20 can carries out a function of reading out again the transport packets stored in the hard disk 13 in a FIFO (First In First Out) fashion and applying the read out transport packets to the parser 11.

If the user requests switching of a current channel (S303), the controller 20 stores information about the current channel in the system memory 20a as "previous channel information" and commands the signal demodulator 9 and the demultiplexer 10 to perform resonation at the channel requested for switching (S311). If the channel switching request of the user corresponds to switching between sub-channels within the current resonated channel, the channel switching request is directed only to the demultiplexer 10 and the demultiplexer 10 classifies and outputs the transport stream of the corresponding sub-channel. According to the channel switching command of the controller 20, the transport stream of the corresponding channel (and the sub-channel) is applied to the parser 11 and the transport stream is output as AV signals through the first port 15a of the decoder 15 according to the procedure described above. At this time, too, the video layout formatter 21 composes the AV signals output through the first port 15a as a single screen and outputs the composed screen.

If the user requests "monitoring" (S312) while the broadcasting program of a channel which has been requested for channel switching by the user is being output as a video on a single screen according to the procedure described above, the controller 20 activates monitoring and the following operation such as multi-channel tuning required according thereto is performed (S321).

The controller 20 first reads "previous channel information" stored in the system memory 20a and applies a resonation command to the signal demodulator 9 and the demultiplexer 10 for the channel designated by the information to be additionally resonated. The "monitoring" request can originate from a "particular" key equipped in the user input means such as a remote controller or from selection of a menu provided properly through the screen signal generator 18. According to the application of the additional resonation command, a transport stream corresponding to a broadcasting program on a channel designated by the "previous channel information" is also applied to the parser 11 independently of the transport stream currently output; accordingly, PES packets belonging to the two transport streams are stored in the respective areas of the buffer memory 12. The decoder 15, too, according to an additional decoding command from the controller 20, performs decoding operation against PES packets stored additionally in the buffer memory 12 and outputs the decoded PES packets as AV signals through a second port 15b.

Figure 4:
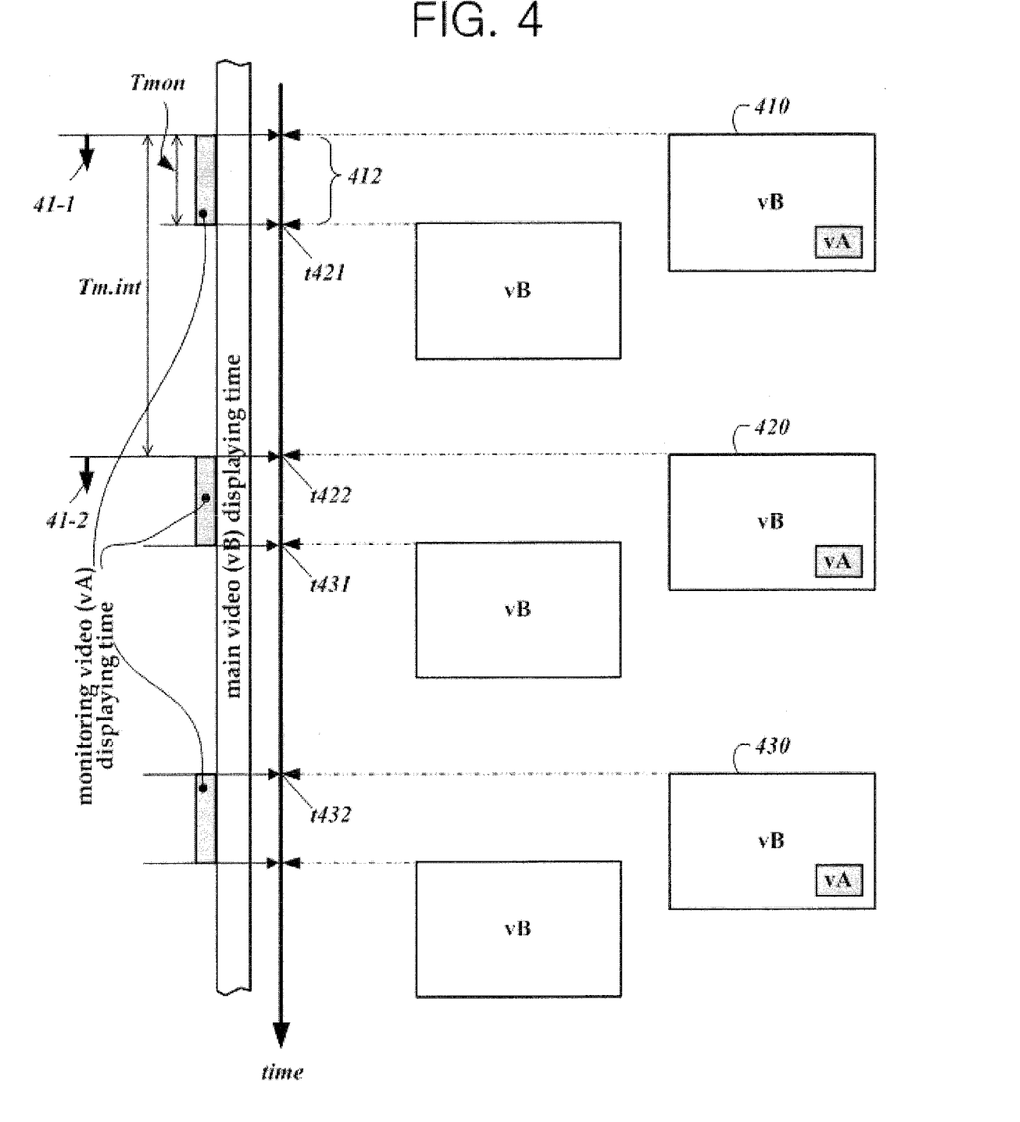
FIG. 4 illustrates a procedure of displaying a broadcasting video of another channel in a small window intermittently for monitoring of the user in addition to a main video currently output according to one embodiment of the present invention.

Meanwhile, the controller 20 commands the video layout formatter 21 to compose a multi-view screen and sets multi-view configuring information by designating the output signal of the second port 15b (in what follows, the video expressed by this output signal is denoted by 'vB') as a "main channel signal" and the output signal of the first port 15a (in what follows, the video expressed by this output signal is denoted by 'vA') as a "monitor channel signal". Although the present embodiment distinguishes ports of video output signal from each other for separating video sources, it is equally possible that the ports of video output signal are not separated from each other but information for distinguishing video sources is added to the video output signals and based on the additional information, the video layout formatter 21 can separate the corresponding video signals received from a common input port. The multi-view configuring information which has been set as the above ("main channel—the second port", "monitor channel—the first port") is stored temporarily. Accordingly, the video layout formatter 21, as shown in FIG. 4, disposes the individual video coming from both the input AV signals according to a predetermined screen layout and thus composes a final multi-view AV signal by which multiple videos vA and vB are displayed together 410 and outputs the final AV signal (S322). Regarding audio signals, the audio signal embedded in the signal designated as a "main channel signal" is selected (21a of FIG. 2) and outputted. The screen layout is determined by the controller 20 and various other forms can also be implemented. For example, a layout form where a small screen is contained in a full screen or a layout form where two screens of the same size are disposed respectively in the left and right half of the entire screen can be displayed and is not limited to the exemplary forms illustrated above. As soon as the multiple videos vA and vB are displayed on a single screen according to the layout designated as above, the controller 20 sets the timer 20b with the time information (monitoring interval Tm.int and monitoring time Tmon) stored in the environmental variable for monitoring and starts countdown 41-1.

In the embodiment described above, at the time of the user's issuing a "monitoring" request, a current channel was set as a 'monitor channel' and the previous channel a 'main channel' and according thereto, the corresponding videos have been disposed on the screen; in another embodiment according to the present invention, the previous channel can be set as a 'monitor channel' and the current channel a 'main channel' and according thereto, the corresponding videos can be disposed on the screen.

As described above, if the user requests channel switching while multiple videos vA and vB coming from multiple channel resonation are output together to be displayed on the same screen according to a designated screen layout 412, the controller 20, by referring to the multi-view configuring information ("main channel—the second port", "monitor channel—the first port") stored temporarily, controls the signal demodulator 9 and the demultiplexer 10 for the channel resonating at a broadcasting program output through the second port 15b which is currently set as a main channel to switch to a channel requested for switching. Accordingly, the output video vB is replaced with a program video of the switched channel while the monitoring video vA is maintained as shown in FIG. 4.

If time-out t421 occurs from the timer 20b (S323) as the designated monitoring time Tmon elapses while in the state 412 where multiple videos vA and vB coming from multi-channel resonation are being displayed together in the same screen, the controller 20 deactivates the count of the monitoring time and commands the video layout formatter 21 to exclude AV output signals of the first port 15a designated as a current monitor channel. According to this command, the video layout formatter 21 composes the single-view screen by using the video vB only from AV output signals of the second port 15b and outputs the composed video (S331). In other words, from this point on, the user can watch programs of a broadcasting channel in a conventional watching state before monitoring. The state above lasts for a time period of the monitoring interval Tm.int subtracted by the monitoring time Tmon.

In another embodiment according to the present invention, in order to exclude the monitoring video vA generated by AV output signals of the first port 15b from final outputs, resonating operation of the signal demodulator 9 and/or transport stream selection operation of the demultiplexer 10 to obtain the corresponding AV signals can be stopped.

If time-out t422 of the monitoring interval Tm.int occurs at the timer 20*b* (S332) while the user watches a video vB in a single screen, the controller 20 re-activates the monitoring interval Tm.int and countdown of the monitoring time Tmon 41-2 and at the same time, by referring to the configuring information stored temporarily ("main channel—the second port", "monitor channel—the first port"), commands again the video layout formatter 21 to compose a multi-view screen by using output signals of the second port 15*b* as a main channel signal. According thereto, again, multiple videos vA and vB are disposed according to a predetermined screen layout and thus displayed in the same screen 420 (S322). As described in one embodiment, if the corresponding channel resonation is stopped while the monitoring video is not displayed, a process of re-tuning the corresponding channel according to the description above is accompanied by operations of the multi-view screen composition. And if the monitoring time Tmon is timed out t431 again (S323), the controller 20 deactivates the count of the monitoring time Tmon of the timer 20*b* and applies a command to the output screen composer 21 to exclude the monitoring video vA and to output a single video screen (S331).

The singe-view state is maintained until the monitoring interval Tm.int is timed out t432 at the timer 20*b*; if timed out (S332), the controller 20 performs control operation as described above to cause a multi-view screen 430 including the monitoring window vA to be displayed for the monitoring time Tmon (S322).

According to the embodiment described in detail above, a process of displaying the video of a channel to be monitored in a predetermined area together with a main video is repeated for the monitoring time Tmon every monitoring intervals Tm.int.

According to the operation described in the embodiments, the user is enabled to automatically check the video on another channel to be monitored for a relatively short time period with a predetermined time interval while he or she is watching the program of a current channel.

In order to reduce interference due to the monitoring video or window in the user's watching a broadcasting program as possibly as can be, the monitoring time Tmon is determined in such a way not to exceed a half of the monitoring interval Tm.int. In one embodiment according to the present invention, the monitoring interval Tm.int can be 30 seconds, 1 minute, 1 minute and 30 seconds, 2 minutes, or 3 minutes (which is not limited thereto); the monitoring time Tmon can be one, two, three, five, or ten seconds (which is not limited thereto). In another embodiment according to the present invention, it is equally possible that the monitoring time Tmon is not determined independently but automatically as a predetermined ratio (for example, 5%, 10%, 15%, or 20%) of the monitoring interval Tm.int.

As described above, if the user requests "switching to a monitor channel" while the video of the monitor channel is displayed in a predetermined area of the screen every intervals Tm.int, the controller 20 checks whether the monitoring video is currently displayed (S341), in other words, whether the monitoring time Tmon is counted down and at the same time, it is before occurrence of time-out. If the state corresponds to the multi-view display where the monitoring video is displayed, operation of switching the monitor channel to the main channel is carried out (S351); otherwise, the request is ignored. In another embodiment according to the present invention, although the monitoring video is not displayed at the time of the "switching to the monitoring channel" request, if the time lapse after the monitoring video has been deleted (from the standpoint of the viewer, the time lapse since the monitor video has disappeared from the screen) is within a predetermined time period (e.g., within three or five seconds), the operation of switching the monitoring channel to the main channel is carried out (S351). The predetermined time period is set in such a way that the monitoring interval Tm.int subtracted by the monitoring time Tmon does not exceed, for example, 50%.

Figure 5A:
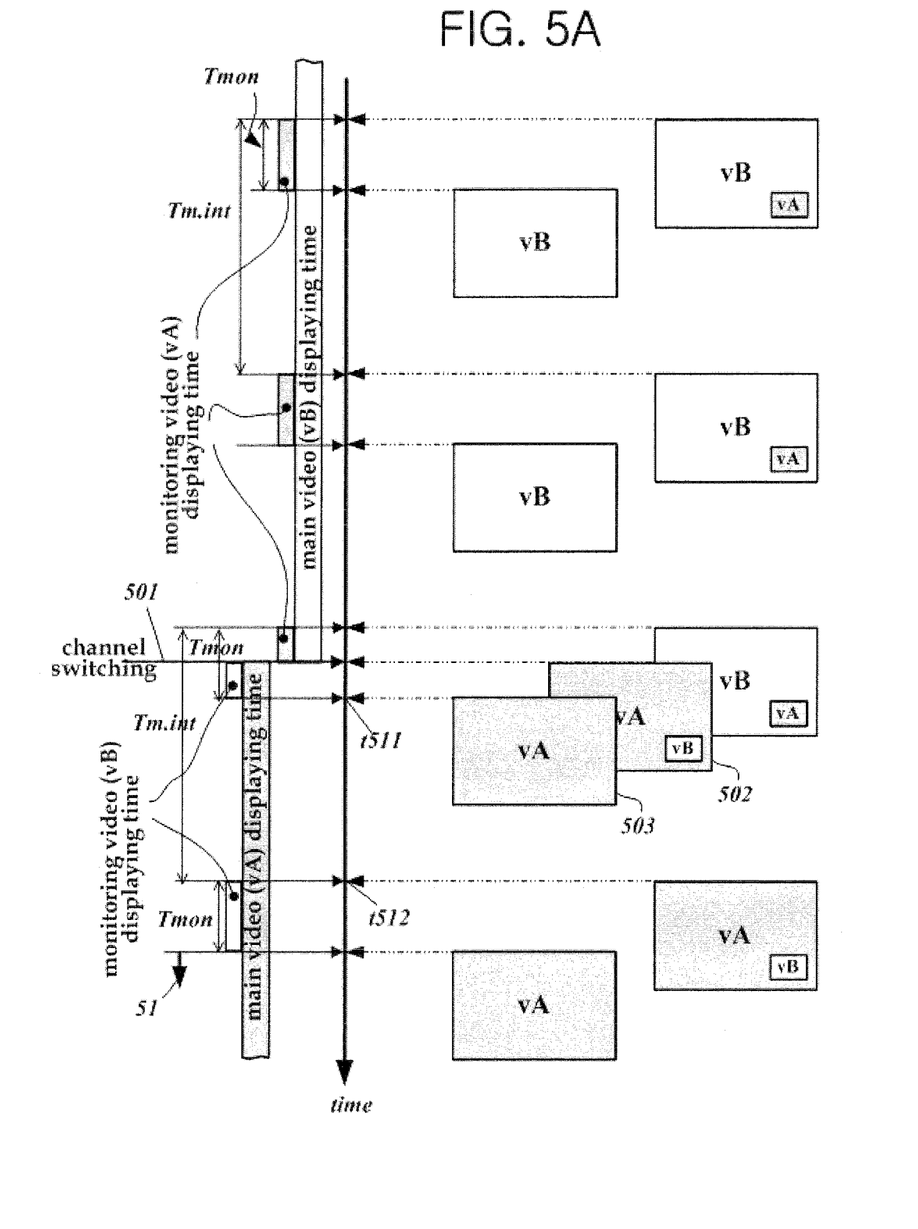
FIGS. 5A to 5C respectively illustrate examples of switching between video on a main channel and video on a monitor channel at the time of a channel switching request of the user according to embodiments of the present invention.

At the time of switching the monitoring channel to the main channel, the controller 20 changes the current multi-view configuring information stored temporarily ("main channel—the second port", "monitor channel—the first port") to that of "main channel—the first port" and "monitor channel—the second port"; and commands the video layout formatter 21 to compose a multi-view display with output signals of the first port 15*a* as the signal of the main channel. Accordingly, as shown in FIG. 5A, a multi-view screen 502 is generated where the monitor video vA before channel switching is changed to the main video and the main video vB to a sub-video. In other words, if the video of the monitor channel is changed to the main video according to the channel switching request for the monitor channel, the video channel of a current main display is automatically changed to the monitor channel.

The video layout formatter 21, according to the command of the multi-view display, outputs audio output signals by selecting AV signals of the first port 15*a* from the AV signals of the second port 15*b*. Since the signal of the main channel has been changed from the output signal of the second port 15*b* to that of the first port 15*a*, if the user changes the channel at this time of setting, the controller 20 may change the resonating channel of the signal demodulator 9 providing output signals of the first port 15*a* rather than the second port 15*b* or select another stream of the demultiplexer 10.

If time-out t511 of the monitoring time Tmon occurs from the timer 20*b* after switching to the monitor channel as described above, the controller 20 deactivates the count of the monitoring time and commands the video layout formatter 21 to exclude AV output signals of the second port 15*b* designated as a current monitor channel. According to this command, the video layout formatter 21 composes the screen 503 by using the video vA from AV output signals of the first port 15*a* only and outputs the composed video. Afterwards, if the monitoring interval Tm.int counted by the timer 20*b* expires t512, the controller 20 re-activates 51 the monitoring interval Tm.int and the countdown of the monitoring time Tmon and at the same time, by referring to the current multi-view configuring information ("main channel—the first port", "monitor channel—the second port"), issues a command again to the video layout formatter 21 to produce a multi-view display by using output signals of the first port 15*a* as main channel signals. According thereto, again, a multi-view screen including the monitoring video vB is displayed for the monitoring time Tmon.

Figure 5B:
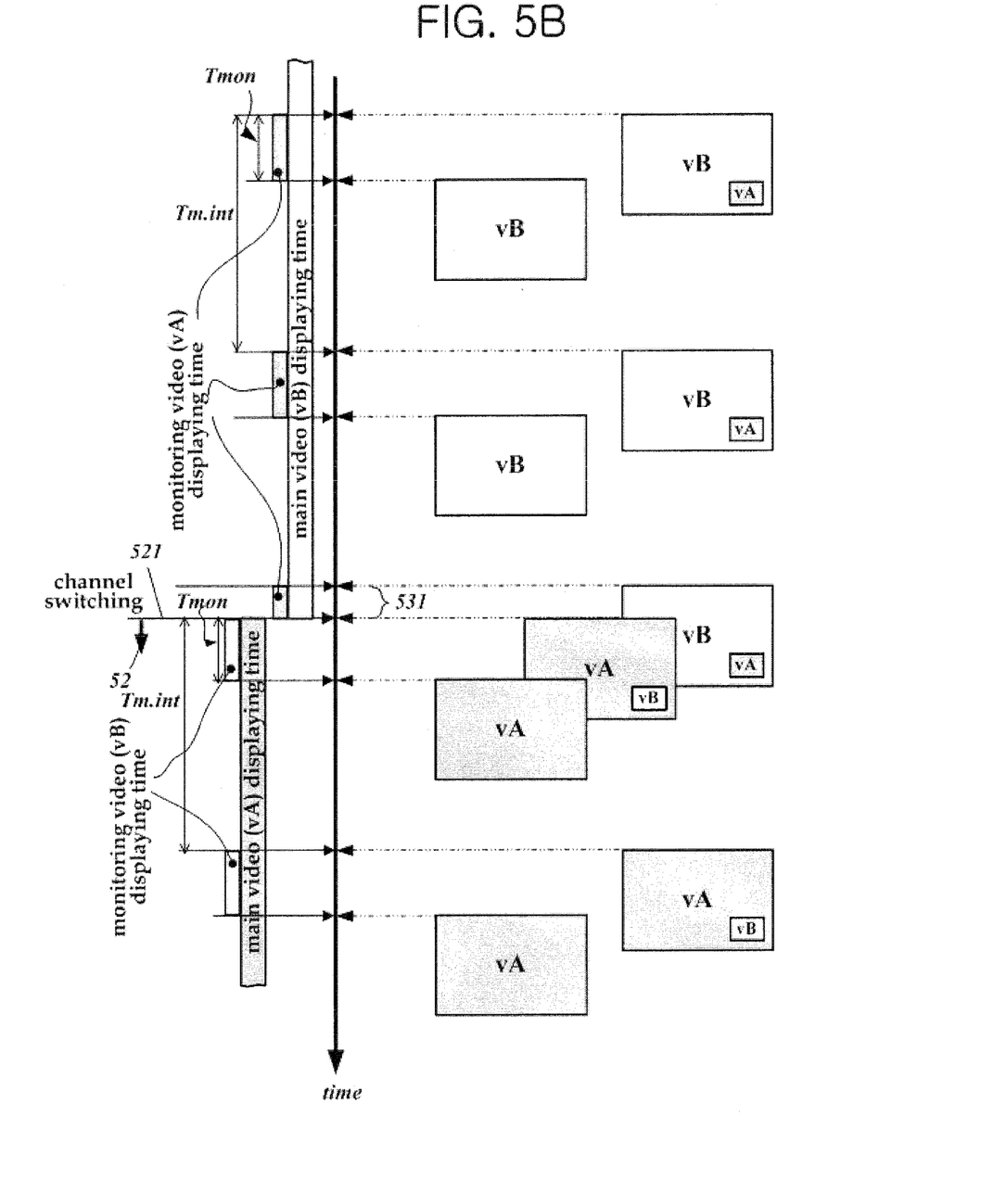

In the embodiment described with reference to FIG. 5A, time values related to monitoring (Tmon and Tm.int) were not set again but maintained a current count value when switching to the corresponding monitor channel while monitoring another channel. Another embodiment according to the present invention re-activates time values related to the monitoring (Tmon and Tm.int) when switching to the monitoring channel. FIG. 5B illustrates the display time of a monitor video according thereto. As shown in FIG. 5B, at the time of switching 521 to the monitoring channel, the multi-view display configuring information is changed accordingly and a command instructing a multi-view display by using output signals of the first port 15*a* as main channel signals is applied to the video layout formatter 21 and at the same time, time variables related to the monitoring (Tmon and Tm.int) are re-activated 52. Time 531 elapsed for channel switching due to the re-activation is ignored. Therefore, after channel switching, the monitoring time Tmon and the monitoring interval Tm.int are newly applied for the re-composed display layout (main screen: vA, sub-screen (in small window): vB). For example, if the monitoring time Tmon is two seconds and the monitoring interval Tm.int is 30 seconds, the monitor video vB is displayed for two seconds and then disappears; the monitor video is displayed again 28 seconds later.

As described in the embodiments above, by switching a channel currently viewed to the monitor channel at the time of switching to the monitor channel, if sports games which include scenes of scoring a point are broadcast on both channels, the user can watch both channels conveniently in an alternate manner without missing the scenes of scoring a point as possibly as can be.

Figure 5C:
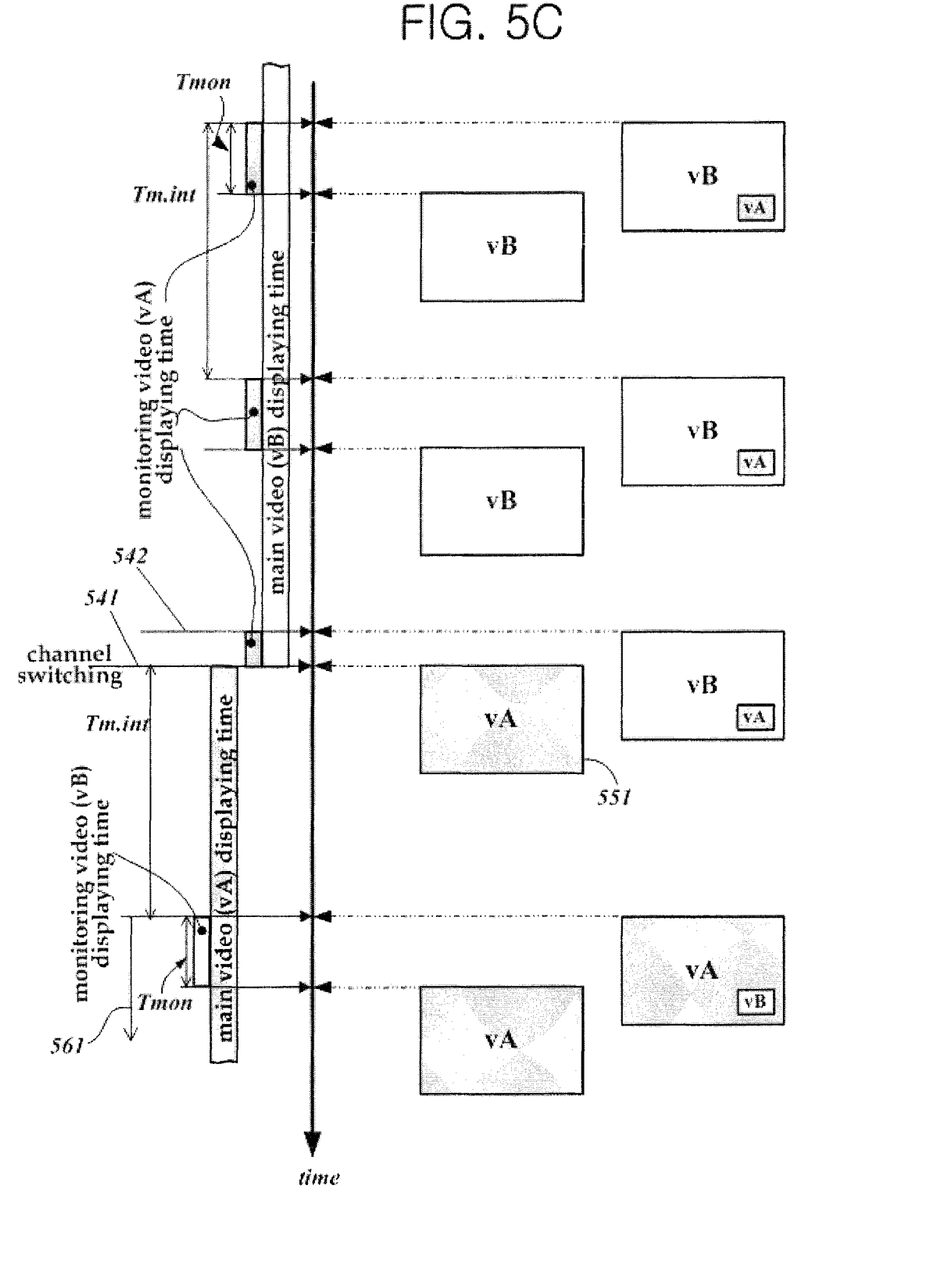

In another embodiment according to the present invention, at the time of switching to the monitor channel, operation of switching the video of the monitor channel to the main screen is carried out but the video of the main channel is not composed as a monitor video. FIG. 5C illustrates an example of changing the composition of the output screen according thereto. As shown in FIG. 5C, at the time of channel switching 541, the video of the monitor channel before channel switching is composed as a single screen 551 and the composed screen is output. As a matter of course, the controller 20, according to the channel switching request, changes the multi-view configuring information into that of "main channel—the first port" and "monitor channel—the second port". Counting of the monitoring time Tmon is deactivated and the monitoring interval Tm.int is re-activated. In the present embodiment, a single screen is displayed for the initial monitoring interval Tm.int; after the time-out 561 of the first monitoring interval Tm.int since channel switching, multi-view screen output and single video screen output alternate in the same way as the embodiment described above. In the embodiment of FIG. 5C, at the time of the channel switching 541, the monitoring time Tmon may be deactivated and the monitoring interval Tm.int may not be re-activated. If it is the case that a current count value is used as it is while not re-activating the monitoring interval Tm.int, the multi-view screen output and the single video screen output start to repeat alternation once the monitoring interval elapses from the time of the previous re-activation time 542.

If the user requests release of monitoring while a channel besides a current channel is being monitored according to one of the embodiments described above S361, the controller 20 deactivates the operation of counting the times related to monitoring of the timer 20b and commands the video layout formatter 21 to compose a single-view screen from AV signals of the output port of the decoder 15 (S371) which is set as a main channel in the currently stored multi-view configuring information. In addition, the controller 20 checks the output port of the decode 15 which is set as a monitor channel and stops resonation operation of the signal demodulator 9 to obtain AV signals of the output port and/or the operation of selecting a transport stream of the demultiplexer 10. If it is found that the release of monitoring has not been requested at the step of S361 for checking the request of monitoring release, the controller 20 checks whether a current video signal output state corresponds to multi-view display or single-view display and according to the checking result, enters the step S322 of multi-view screen composition (P361a) or the step S331 of single video screen composition (P361b).

The embodiments described above illustrate a method of selecting a channel currently viewed as a monitoring channel. In other words, if monitoring is requested while the user watching a program on a current channel, the current channel was set to display as a monitoring video and the previous channel as a main screen.

Figure 6:
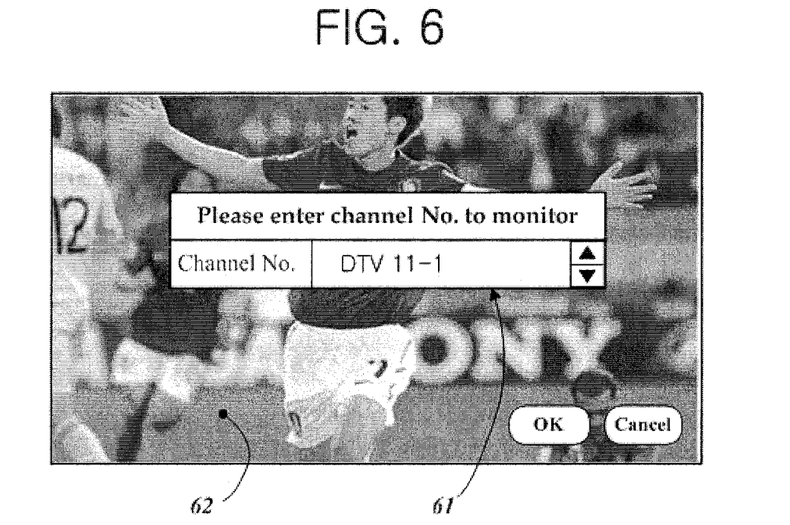
FIG. 6 illustrates an input window provided to receive a monitor channel setting according to one embodiment of the present invention.

In another embodiment according to the present invention, another channel is set as a monitoring channel without channel switching while the user is watching an arbitrary channel. For example, if the user makes a request for monitoring while an arbitrary channel is being resonated and output, the controller 20 provides an input window 61 for receiving an input for setting of a monitoring channel as shown in FIG. 6 through the screen signal generator 18. At this time, the controller 20, to allow the user to input a channel conveniently, can display numbers for input cells corresponding to the respective channels obtained previously one by one according to the arrow key inputs by the user (up-down or left-right key).

If a channel for monitoring is selected, the controller 20 commands the signal demodulator 9 or the demultiplexer 10 to resonate at the channel or select a sub-channel; controls the decoder 15 to decode a transport stream obtained according thereto and output the decoded stream to another port (for example, the second port 15b) rather than the port (for example, the first port 15a) through which AV signals are currently output; and sets the multi-view configuring information accordingly (for example, main channel—the first port and monitor channel—the second port). The controller 20 also sets time variables related to monitoring (Tmon and Tm.int) for the timer 20b and starts countdown; and commands the video layout formatter 21 to compose a multi-view screen by using, for example, output signals of the first port 15a as main channel signals. Accordingly, the video of a channel to be monitored is displayed with the main video 62 (namely, the video of the main channel) in a single screen. Afterwards, based on time-out of the time variables related to the monitoring, monitoring which displays the video of the selected channel intermittently is performed.

In the embodiment described above, if the values in the environmental variable for monitoring have not been set at the time of issuing a monitoring request from the user, the controller 20 can carry out the operation of monitoring another channel described above after providing an input window for receiving those values, receiving values about the corresponding environmental variable, and setting the environmental variable by the received values.

In the embodiments described above, the monitoring operation has been initiated by the monitoring request from the user. In another embodiment according to the present invention, the monitoring operation is started for a designated channel at the time designated by the user. For example, if the user wants to watch a sports game such as a football or basketball game supposed to be broadcast on another channel while watching a drama on an arbitrary channel, the user can receive not only the channel to be monitored but also the time at which monitoring of the channel is to be started (close to the broadcasting time announced), thereby setting the monitoring operation. If the monitoring channel and the start time are determined together as described above, the controller 20 stores the values and checks continuously whether it corresponds to the monitoring time; if it becomes the corresponding time, according to the procedure described above, the controller 20 decodes digital streams of the channel into audio/video signals by tuning to the corresponding monitoring channel or selecting the corresponding sub-channel; and composes multi-view signals for displaying multi videos on a screen with the decoded video signals of the sub-channel and the main video (video of a main channel) being currently watched, and then outputs the composed multi-view signals. The monitoring operations afterwards are carried out in the same way as described above.

Figure 7A:
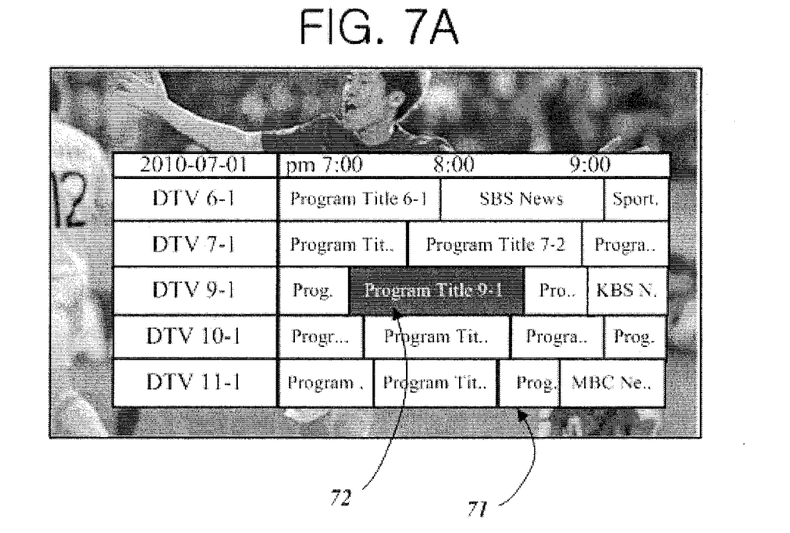
FIGS. 7A and 7B are screen examples of setting monitoring start time and a monitoring channel according to another embodiment of the present invention.
Figure 7B:
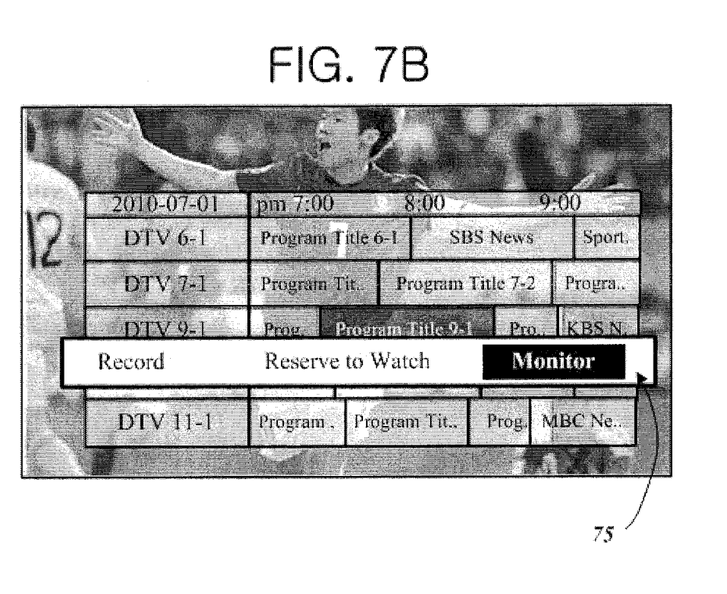

In another embodiment according to the present invention, start time for monitoring is not input directly from the user but can be designated through EPG provided by digital broadcasting. FIGS. 7A and 7B are screen examples of setting monitoring start time and a monitoring channel according to the present embodiment. The EPG is obtained through management information (for example, PSI) of each channel, which is stored in the buffer memory 12 after decoding. As shown in FIG. 7A, if the user selects a particular program (which is also called an "EPG event") 72 from an EPG list 71 provided through the screen signal generator 18 according to the request of checking EPG by the user, the controller 20, as shown in FIG. 7B, provides a requested operation selection window 75 for the user to select "monitoring". If the user requests "monitoring" for the selected EPG event, the controller 20 checks the channel number and broadcasting start time of the corresponding EPG event from the EPG list and carries out the monitoring operation about the corresponding channel by starting the monitoring operation from the moment it becomes the broadcasting start time.

In one embodiment according to the present invention, if the broadcasting start time of the selected EPG event is before the current time, in response to the "monitoring" request of the user, channel switching to the very channel can be carried out without carrying out the monitoring described above. In another embodiment according to the present invention, if the broadcasting start time of the EPG event selected by the user from the EPG list provided on a screen as shown in FIG. 7A precedes the current time, the user can be made not to request monitoring for the corresponding EPG event by excluding a selection item of "monitoring" from a selection window such as FIG. 7B.

In one embodiment according to the present invention, for an EPG event selected by the user, monitoring can be started before the broadcasting start time of the event by a predetermined spare time. The spare time is set by the user through an initial setting menu provided appropriately and then included in the environmental variable for monitoring.

In the embodiments described above, monitoring another channel other than a current one was carried out. In another embodiment according to the present invention, a plurality of channels other than a current one can be monitored. In the present invention, monitoring videos having as many channels as the signal demodulator 9 can simultaneously resonate or as many sub-channels as the demultiplexer 10 can simultaneously select and output are displayed together with the video of a main screen; if it is the case that the number of channels (or sub-channels) exceeds what is allowed for simultaneous resonation (or selection), videos are obtained by distributing channel resources sequentially to the respective monitoring channels selected and the obtained videos are output as monitoring videos. In case each monitoring video is output sequentially from multiple videos, the corresponding video lasts on the screen for each monitoring time Tmon or for the monitoring time Tmon divided by the number of monitoring channels Tmon/N.

In the embodiment described above, described was operation of monitoring another channel or other channels while the user watching a program on a broadcasting channel. The present invention, however, is not limited to broadcasting channels but can be applied to all types of sources providing video contents. For example, in one embodiment according to the present invention, the user can set an arbitrary broadcasting channel as a monitoring channel while the user watches video signals received from an external video device connected, a recorded broadcasting program, video contents stored in a portable storage device connected in a detachable way (for example, SD memory, USB memory, an external hard disk, and the like), or video contents streamed online or downloaded through the data communication unit. As a matter of course, monitoring in the opposite direction is also possible (monitoring of video contents of another source while watching a broadcasting program). In the present embodiment, during selection of a monitoring source, in addition to channel information, information specifying the type of a source is added. For example, if the user requests monitoring, selection of a source type (for example, a broadcasting channel, a recorded program, a file of a connected medium, a downloaded file, or streaming contents, which is not limited to the above) is made first and by indicating a particular content identifier (for example, a channel number, a name of a recorded program, a file name, URL of streaming contents, and the like) from the selected source type, one video contents is made to be selected. Monitoring operation is carried out as described above for the video contents of an arbitrary source selected in the same way as above.

The present invention is not limited to the preferred embodiments described above but it should be easily understood by those skilled in the art that various embodiments with improvements, modifications, substitutions, or additions can be obtained within the spirit and the scope of the invention. If embodiments with the improvements, modifications, substitutions, or additions fall within the scope as defined by the following appended claims, it should be regarded that the corresponding technical spirit belongs to the scope of the present invention.

What is claimed is:

1. A method for monitoring video provided from a content source, the method comprising:

outputting a first video signal provided from a first content source; and displaying a video from a second video signal intermittently with a video from the first video signal on a single screen, the second video signal being provided from a second content source other than the first second content source, by:

causing the single screen to be in a multi-view state where a video from the second video signal is displayed with a video from the first video signal on the single screen for a first time period;

causing the single screen to be in a single-view state, after the first time period, where a video from the first video signal is displayed alone on the single screen for a second time period longer than the first time period; and causing the multi-view state and the single-view state to be automatically repeated in an alternate manner on the single screen after the second time period.

2. The method of claim 1, further comprising:

switching between a video area for the first video signal and a video area for the second video signal on the single screen according to a request of a user; and causing the single screen to display a video from the first video signal intermittently with a video from the second video signal, wherein the switching comprises causing the single screen to display a video from the first video signal with a video from the second video signal during a particular time equal to or shorter than the first time period, and the causing the single screen to display a video from the first video signal intermittently with a video from the second video signal comprises:
- causing the single screen to be in a first single-view phase, after the particular time, where a video from the second video signal is displayed alone on the single screen for the second time period;
- causing the single screen to be in a multi-view phase, after the second time period, where a video from the first video signal is displayed with a video from the second video signal on the single screen for the first time period;
- causing the single screen to be in a second single-view phase, after the first time period, where a video from the second video signal is displayed alone on the single screen for the second time period; and
- causing the multi-view phase and the second single-view phase to be repeated in an alternate manner.

3. The method of claim 2, wherein the switching comprises ignoring the request if the request is not made while the first time period passes.

4. The method of claim 1, further comprising:
- causing the single screen to display a video from the second video signal alone for a time equal to or longer than the second time period according to a request of a user; and
- causing the single screen to display a video from the first video signal intermittently with a video from the second video signal after the time,
- wherein the causing the single screen to display a video from the first video signal intermittently with a video from the second video signal comprises:
- causing the single screen to be in a multi-view phase, after the second time period, where a video from the first video signal is displayed with a video from the second video signal on the single screen for the first time period;
- causing the single screen to be in a single-view phase, after the first time period, where a video from the second video signal is displayed alone on the single screen for the second time period; and
- causing the multi-view phase and the single-view phase to be repeated in an alternate manner.

5. The method of claim 1, wherein the second content source is a source of which a video signal is being displayed at a time when a monitoring request is made from a user, and the first content source is a source of which a video signal is being displayed right before a video signal provided from the second content source is displayed.

6. The method of claim 1, wherein the first content source is a source of which a video signal is being displayed at a time when a monitoring request is made from a user, and the second content source is a source of which a video signal is being displayed right before a video signal provided from the first content source is displayed.

7. The method of claim 1, wherein the second content source is a source being designated as a monitoring object by information entered by a user through a provided selection menu screen.

8. The method of claim 1, wherein the second content source corresponds to a program item being designated as a monitoring object from a broadcasting program schedule provided on a screen based on an electronic program guide received through broadcasting signals.

9. The method of claim 1, wherein the displaying a video from the second video signal intermittently with a video from the first video signal on the single screen is started automatically at a time that is specified by time information entered directly from a user or by a broadcasting start time of a program item included in an electronic program guide received through broadcasting signals.

10. An apparatus for outputting video signals of contents, the apparatus comprising:
- a receiver adapted for obtaining a plurality of contents;
- a decoder adapted for decoding data of at least one of the plurality of contents obtained by the receiver and outputting one or more video signals of the at least one content;
- a video formatter adapted for outputting the one or more video signals of which corresponding videos are disposed in a specified layout on a single screen; and
- a controller adapted for controlling the video formatter for a video from a second video signal belonging to the one or more video signals to be displayed intermittently on the single screen with a video from a first video signal belonging to the one or more video signals,
- the controller being further adapted for controlling the video formatter to:
- cause the single screen to be in a multi-view state where a video from the second video signal is displayed with a video from the first video signal on the single screen for a first time period;
- cause the single screen to be in a single-view state, after the first time period, where a video from the first video signal is displayed alone on the single screen for a second time period longer than the first time period; and
- cause the multi-view state and the single-view state to be automatically repeated in an alternate manner.

11. An apparatus of claim 10, wherein the controller is further adapted for controlling the video formatter to:
- switch between a video area for the first video signal and a video area for the second video signal on the single screen according to a request of a user; and
- cause the single screen to be in an intermittent multi-view phase where a video from the first video signal is displayed intermittently with a video from the second video signal on the single screen,
- wherein the controlling to switch comprises causing the single screen to display a video from the first video signal with a video from the second video signal during a particular time equal to or shorter than the first time period, and
- operations conducted in the intermittent multi-view phase comprises:
- causing the single screen to display a video from the second video signal alone for the second time period after the particular time; and
- causing a first-type of view phase lasting for the first time period and the second-type of view phase lasting for the second time period to be repeated in an alternate manner, the first-type of view phase being a phase where a video from the first video signal is displayed with a video from the second video signal on the single screen, the second-type of view phase being a phase where a video from the second video signal is displayed alone on the single screen.

12. The apparatus of claim 10, wherein the controller is further adapted for controlling the video formatter to:
- display a video from the second video signal alone for a time equal to or longer than the second time period on the single screen according to a request of a user; and
- cause the single screen to be in an intermittent multi-view phase, after the time, where a video from the first video signal is displayed intermittently with a video from the second video signal on the single screen, wherein operations conducted in the intermittent multiview phase comprises causing a first-type of view phase lasting for the first time period and the second-type of view phase lasting for the second time period to be repeated in an alternate manner, the first-type of view phase being a phase where a video from the first video signal is displayed with a video from the second video signal on the single screen, the second-type of view phase being a phase where a video from the second video signal is displayed alone on the single screen.

13. The apparatus of claim 12, wherein the controller is further adapted for ignoring the request if the request is not made while the first time period passes.

14. The apparatus of claim 10, wherein either the first content source or the second content source is a source of which a video signal is being displayed at a time when a monitoring request is made from a user, and either the second content source or the first content source is a source of which a video signal is being displayed right before a video signal provided from the second content source is displayed.

15. The apparatus of claim 10, wherein the second content source is a source being designated as a monitoring object by information entered by a user through a selection menu screen provided by the controller.

16. The apparatus of claim 10, wherein the second content source corresponds to a program item being designated as a monitoring object from a broadcasting program schedule provided on a screen based on an electronic program guide received through broadcasting signals.

17. The apparatus of claim 10, wherein the controller is further adapted for starting a control operation at a specific time to display a video from the second video signal intermittently with a video from the first video signal on the single screen, the specific time being specified by time information entered directly from a user or by a broadcasting start time of a program item included in an electronic program guide received through broadcasting signals.

18. The apparatus of claim 10, wherein the receiver is adapted for comprising at least one of:
   a signal demodulator configured to tune to and demodulate a broadcasting signal to output a broadcasting program;
   a storage device configured to store recoded broadcasting programs;
   a video device connecting unit configured to receive video signals inputted through connecting terminals;
   a storage media interfacing unit configured to read out content data from a portable storage medium connected detachably; and
   a communication unit configured to receive video contents from an external server through a data communication network.

19. The apparatus of claim 10, wherein the controller is adapted for providing an input screen through which a user enters a monitoring interval and a monitoring window display time individually, and assigning the entered monitoring window display time to the first time period and the entered monitoring interval subtracted by the monitoring window display time to the second time period.

20. The apparatus of claim 10, wherein the controller is adapted for providing an input screen through which a user enters a monitoring interval, and assigning a time corresponding to a predetermined ratio of the entered monitoring interval to the first time period and the entered monitoring interval subtracted by the assigned time to the second time period.

* * * * *